Feb. 27, 1945.    T. N. BOURKE ET AL    2,370,521
GLARE SHIELD
Filed Aug. 28, 1941
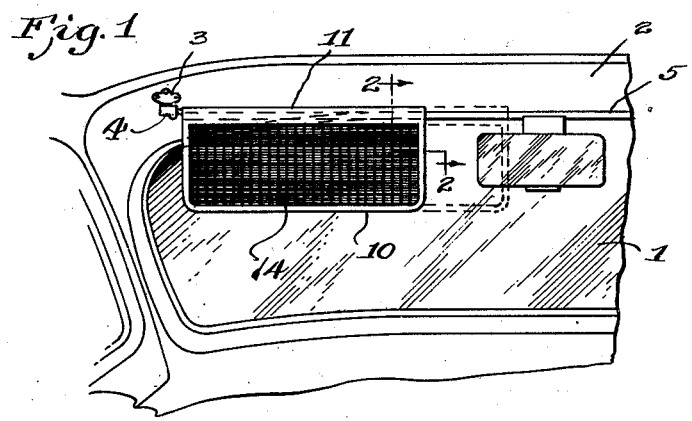
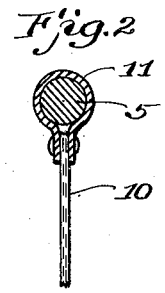
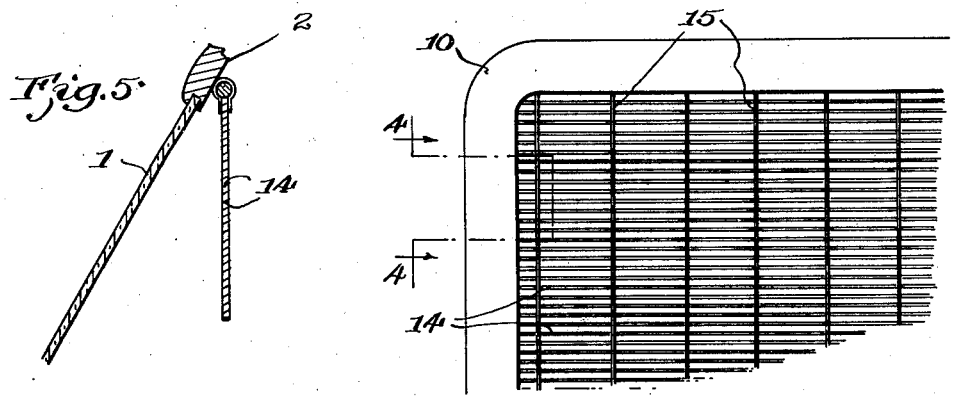
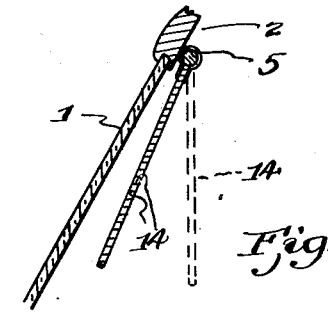
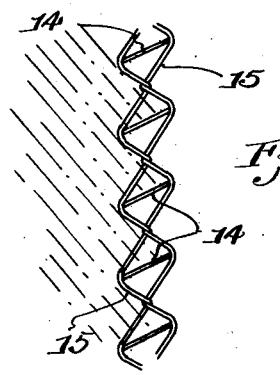
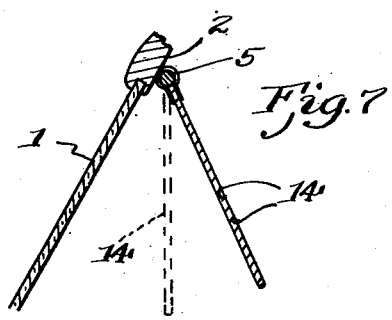
INVENTOR.
Thomas N. Bourke
George Stroh, Jr.
BY
Barnes, Kisselle, Laughlin & Raisch Patented Feb. 27, 1945

2,370,521

UNITED STATES PATENT OFFICE 2,370,521

GLARE SHIELD

Thomas N. Bourke, Grosse Pointe, and George Stroh, Jr., Detroit, Mich.

Application August 28, 1941, Serial No. 408,596

2 Claims. (Cl. 296—97)

This invention relates to glare shields for vehicles for protecting or shading the eyes of the driver or other occupant from the rays and the glare of the sun or artificial light.

The invention is concerned particularly with glare shields which can be manipulated into and out of operating position and otherwise adjusted, and while the glare shield is applicable for use in automotive vehicles, railroad locomotives and airplanes, or the like, it will be described and exemplified herein as associated with an automotive vehicle.

The principal object of the invention is to provide a glare shield which can be positioned before the eyes of the driver of the vehicle or other occupant, for protection against the rays and glare of the sun, but which provides vision through the same. The shield can also be used at night to protect the eyes from the glare of the headlights of on-coming vehicles. To these ends the glare shield comprises a substance in the nature of a fabric including thin strips extending across the shield in substantially parallel relationship. The strips are angularly disposed relative to the plane of the body of the fabric so that each provides a surface which intercepts the rays of light, while the spacing between the parallel strips is such that, notwithstanding their angular relationship, a clear vision through the fabric is provided.

A structure for carrying out the invention is shown in the accompanying drawing. In the drawing Fig. 1 is a view of the interior of an automotive vehicle showing the windshield and the glare shield mounted in the interior of the vehicle.

Fig. 2 is a cross sectional view taken substantially on line 2—2 of Fig. 1.

Fig. 3 is an enlarged elevational view showing a portion of the screen and its structure.

Fig. 4 is a further enlarged sectional view taken substantially on line 4—4 of Fig. 3.

Fig. 5 is a view illustrating the slanting windshield of an automotive vehicle with the glareshield disposed in one operating position.

Fig. 6 is a view similar to Fig. 5 showing another operating position of the glare shield.

Fig. 7 is a view similar to Figs. 5 and 6 showing still another operating position for the glare shield.

The structure shown in Fig. 1 illustrates the windshield 1 of an automotive vehicle above which is the usual header 2. The glare shield may be mounted by means of a bracket 3 secured to the header or other portion of the vehicle and in which is mounted rotatably a supporting member 4 which has an arm or length thereof extending laterally and substantially horizontally, this arm being illustrated at 5. This structure is intended to exemplify one manner by which the glare shield may be mounted.

The glare shield may comprise a frame 10 which has a portion 11 fitting over the arm 5 so that it can rock thereon and it may be slidably mounted so that the shield may be shifted to and from positions indicated by the full and dotted lines in Fig. 1. Thus it will be observed that the glare shield may be swung around the arm 5 to an upward position so that it lies overhead, so to speak, or it may be swung downwardly into operative position as illustrated in Fig. 1. Also, the shield may be swung pivotally in the bracket 3 so that it may be positioned at the side of the occupant instead of at the front.

The shield, as stated above, has a body of fabric-like nature, constructed so that openings therethrough provide ample vision so that, for example, the driver of the vehicle can see the roadway, but also constructed to provide surfaces for intercepting and reflecting the light rays. The form selected for illustrating the invention comprises strips of material 14 extending transversely across the shield substantially in parallel relationship and angularly disposed in respect to the plane of the fabric as illustrated in Fig. 4. These strips are incorporated in or woven into a fabric by means of lacings or bindings 15 which extend across the fabric transversely to the extent of the strips 14 in suitably spaced relationship as illustrated in Fig. 3. Any suitable material may be employed for the strips and bindings such as metal, plastic substances, glass or fiber, although it might be stated that cuprous metal such as bronze or brass has been employed. In this connection the term "fabric" is not to be construed to limit the shield to a body fabricated from separate strips, since some materials may be stamped or formed from the sheet stock while other materials such as plastic or glass may be fashioned in a mold.

With the view of setting forth in a clear and concise manner the type of structure described, an example may be given of the approximate dimensions of a fabric which has been found suitable for the purpose, although it is to be understood that the invention is not limited to these dimensions. In this example the strips 14 had a width of approximately 3/64 of an inch and a thickness of only a few thousandths of an inch. The binding wires were disposed approximately one-half inch apart and the diameter thereof hardly exceeded the thickness of the strips. The strips were spaced apart about 1/16 of an inch, and were disposed at an angle of about 65 to 70 degrees to the plane of the fabric. Thus elongated rectangular shaped openings are provided through the fabric of approximately one-half an inch long and 1/16 of an inch in width. This, of course, is the maximum size of the openings when the line of vision was substantially directly against the edge of the strips and parallel to the plane thereof. Of course, when the fabric is viewed with the line of vision perpendicular to the plane of the fabric the openings are reduced in size due to the angular disposition of the strips as shown in Fig. 4. At this time the flat surfaces of the strip come to view.

The manner in which this glare shield intercepts and reflects light rays and the manner of the use of the shield is illustrated in Figs. 4 to 7. With the shield positioned substantially vertically the light rays strike the upper surfaces of each of the strips and thus the strips intercept the rays and prevent the rays from passing therethrough while at the same time the shield offers clear vision through the same. In Fig. 5 the shield is disposed in a substantially vertical position and it can be readily seen how clear vision is offered although the openings therethrough are reduced somewhat due to the angular disposition of the strips. It can also be seen how the strips present their flat surfaces to the rays of light to intercept and reflect the same. Under some circumstances it may be desired to swing the glare shield forwardly toward the windshield 1 as illustrated in Fig. 6, thus offering maximum vision. The shield, for example, may be used in this position when the sun is quite high in the sky. If the shield be swung rearwardly, as indicated in Fig. 7, the rays of the sun are intercepted when the sun is low in the sky, and although the vision is reduced somewhat there still remains an adequately clear vision for driving purposes. The shield can also be used in a similar position for night driving, thus to protect the eyes of the driver or other occupants from the glaring lights of on-coming vehicles.

While only one glare shield has been illustrated in Fig. 1 it is to be understood that another glare shield may be used adjacent the right hand side of the windshield, or elsewhere when desired. Heretofore it has been the practice to make the glare shields restricted in size because of their opaqueness. The shield of the present invention can be made in a much larger size thus shielding a larger area, and this because the shield provides for vision therethrough.

We claim:

1. A glare shield for a vehicle or the like adapted to be positioned back of a windshield and in the line of sight of an occupant comprising, a supporting border frame, means mounting the frame for adjustable movement so that the area within the frame may be moved into and out of the line of sight and for adjustment of the frame angularly relative to the vertical while in the line of sight, glare shield means within the area and supported by the frame, said glare shield means comprising, a multiplicity of relatively thin and relatively wide flat strips of opaque material extending transversely across the frame from side to side, said strips being disposed in substantially parallel relationship and so that their flat faces are oblique to the plane of the frame and parallel to each other and so that the lowermost edges of the strips lie next adjacent the windshield when in the line of sight, said flat strips being spaced apart to provide vision slots therebetween extending across the frame and reinforcing structural elements extending across the frame in a direction transverse to the flat strips and disposed substantially in parallel relationship for supporting the flat strips, said glare shield means being characterized in that the flat strips are relatively great in number and the structural elements are relatively few in number so as to offer no substantial break in the vision slots in their extent across the frame and further characterized by an obliqueness of the strips relative to the plane of the frame so that, in the range of angular adjustment of the frame while in the line of sight, the vision slots may be varied from a maximum open position relative to the line of sight to a substantially closed position relative to the line of sight.

2. A glare shield for a vehicle or the like adapted to be positioned back of a windshield and in the line of sight of an occupant comprising, a supporting border frame, means mounting the frame for adjustable movement so that the area within the frame may be moved into and out of the line of sight and for adjustment of the frame angularly relative to the vertical while in the line of sight, glare shield means within the area and supported by the frame, said glare shield means comprising, a multiplicity of relatively thin and relatively wide flat strips of opaque material extending transversely across the frame from side to side, said strips being disposed in substantially parallel relationship and so that their flat faces are oblique to the plane of the frame and parallel to each other and so that the lowermost edges of the strips lie next adjacent the windshield when in the line of sight, said flat strips being spaced apart to provide vision slots therebetween extending across the frame and reinforcing structural elements extending across the frame in a direction transverse to the flat strips and disposed substantially in parallel relationship for supporting the flat strips, said glare shield means being characterized in that the flat strips are relatively great in number and the structural elements are relatively few in number so as to offer no substantial break in the vision slots in their extent across the frame and further characterized by an obliqueness of the strips relative to the plane of the frame so that, in the range of angular adjustment of the frame while in the line of sight, the vision slots may be varied from a maximum open position relative to the line of sight to a substantially closed position relative to the line of sight, the glare shield means being still further characterized by strips substantially comparable to the following example, to wit: width about 3/64 of an inch, thickness a few thousandths of an inch, spacing between strips about 1/16 of an inch, angularity of the strips in the vicinity of 65° to 70° to the plane of the frame.

THOMAS N. BOURKE.
GEORGE STROH, Jr.